Feb. 3, 1942.   A. B. CLEVELAND ET AL   2,271,855
APPARATUS FOR STEAM CURING
Filed Dec. 26, 1939   2 Sheets-Sheet 1
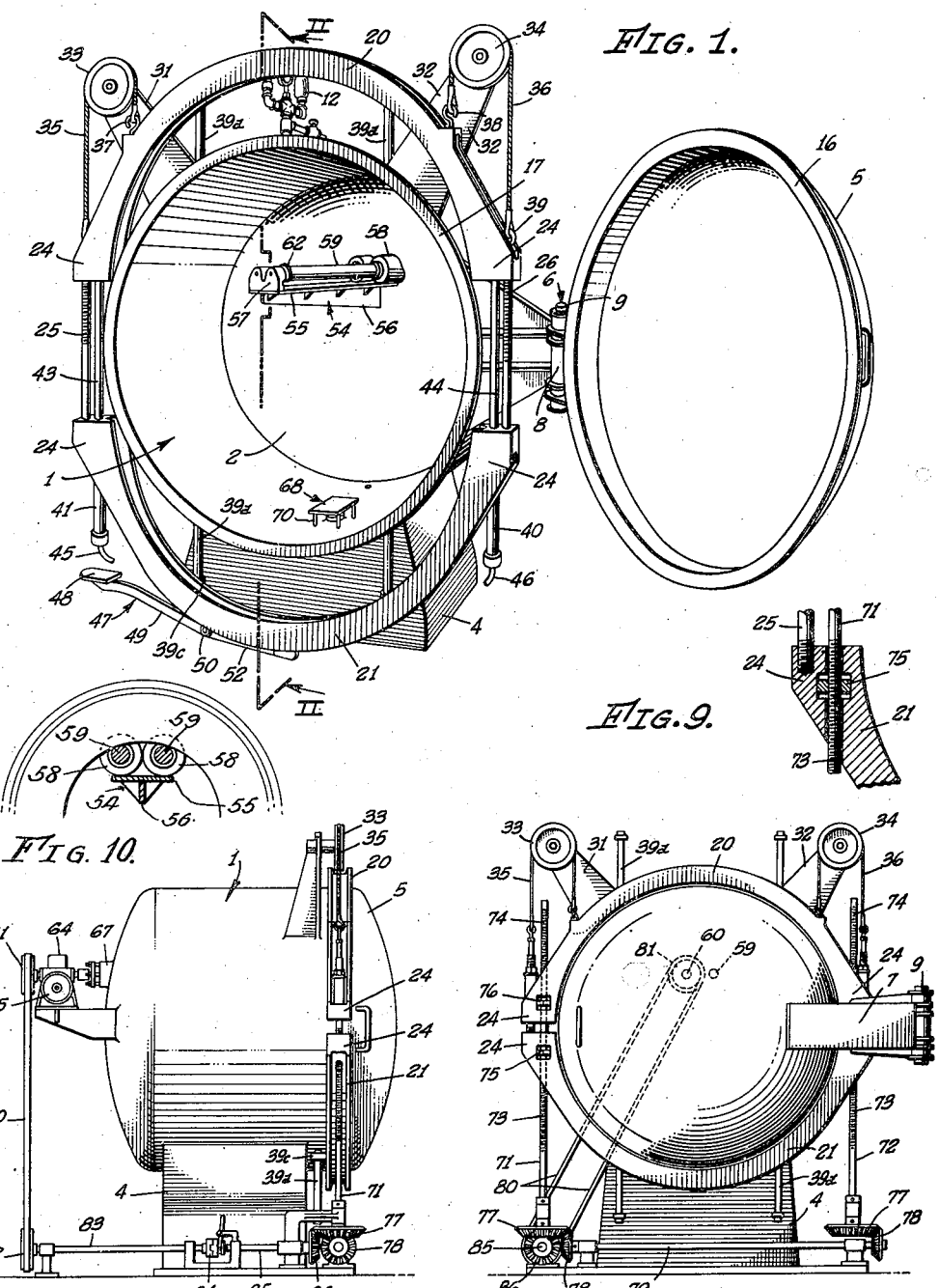
INVENTORS
ARCH B. CLEVELAND
EMIL G. HAAG
CECIL L. RAY
BY
ATTORNEY Feb. 3, 1942. A. B. CLEVELAND ET AL 2,271,855
APPARATUS FOR STEAM CURING
Filed Dec. 26, 1939 2 Sheets-Sheet 2
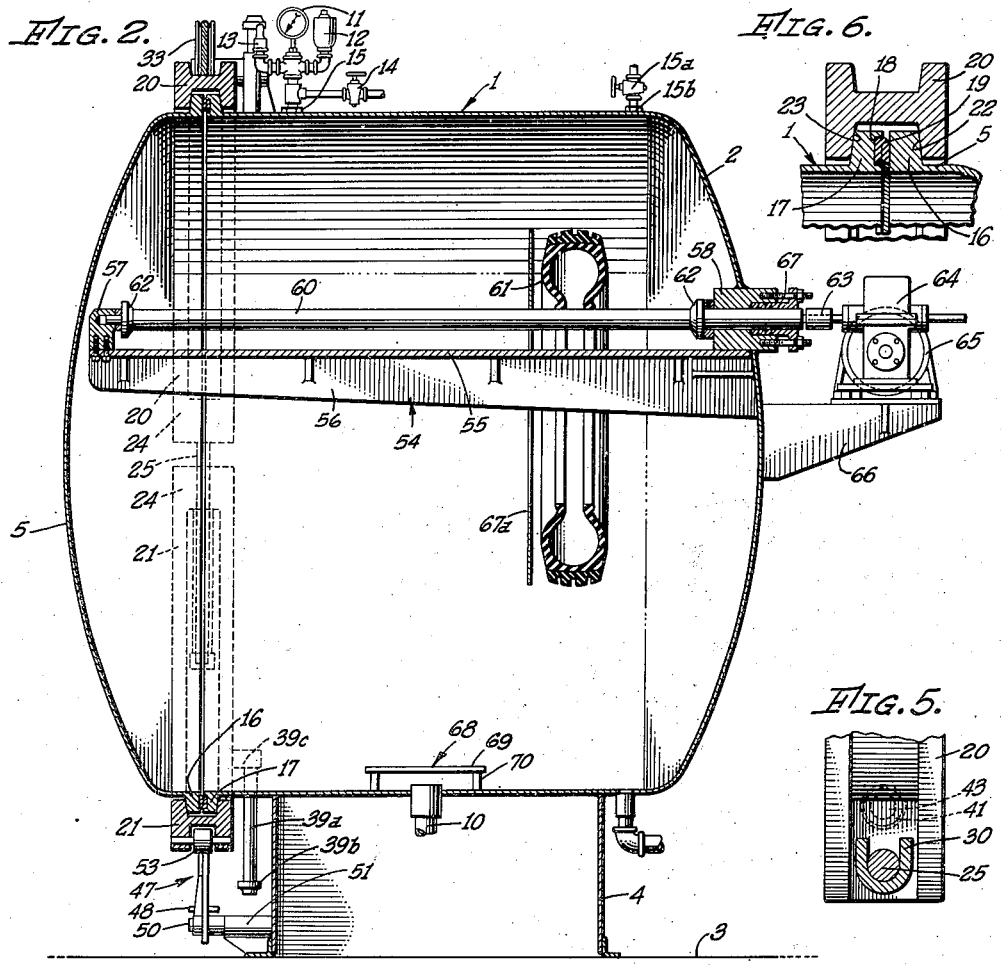
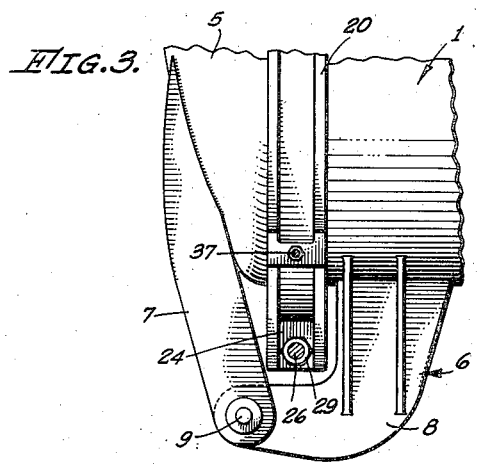
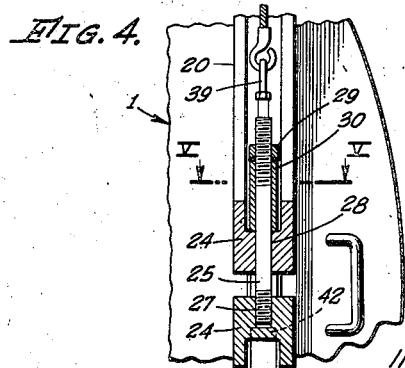
INVENTORS
ARCH B. CLEVELAND
EMIL G. HAAG
CECIL L. RAY
BY
ATTORNEY Patented Feb. 3, 1942

2,271,855

UNITED STATES PATENT OFFICE 2,271,855

APPARATUS FOR STEAM CURING

Arch B. Cleveland, Los Angeles, Emil G. Haag, Alhambra, and Cecil L. Ray, Los Angeles, Calif.; said Haag and said Ray assignors to said Cleveland Application December 26, 1939, Serial No. 310,950

9 Claims. (Cl. 18—7)

Our invention relates to an apparatus for steam curing and has particular reference to an apparatus for steam curing rubber articles, which finds particular utility when employed for vulcanizing rubber tires, and the like.

In the tire manufacturing and repairing industry entire tires are built of raw, uncured or partially cured rubber and old tires are retreaded or recapped by applying a new tread portion of such uncured rubber to an existing tire. In each of these cases it is necessary to subject this new rubber to relatively high temperatures and pressures for a considerable but predetermined period of time in order to complete the vulcanizing process and render the rubber firm and wear-resistant.

In the past this has been accomplished by the use of curing kettles. These kettles comprise large open topped steam chambers within which the tires to be cured are stacked one upon the top of the other. The open top of the kettle is fitted with a closure which may be closed and sealed so that live steam under high temperature and pressure may be admitted to the interior of the chamber to subject the tires enclosed therein to the necessary vulcanizing temperature.

This method and apparatus for curing tires gives rise to numerous disadvantages. During the curing process the new, uncured rubber becomes soft and plastic with the result that the bottom tires in the stack are often deformed and spoiled so as to render them unfit for the use for which they were intended. Furthermore, the heat loss through the walls of the chamber causes the steam within the chamber to gradually condense, forming an accumulation of water in the lower part of each tire. This water, of course, covers a part of all of the tires in the stack, particularly the lower tires, and serves as an insulator to prevent these tires from being heated to a sufficiently high temperature to satisfactorily vulcanize the new rubber.

It has also been found that the temperature within the chamber varies over wide limits from top to bottom so that it is substantially impossible to sufficiently heat the lower tires in the stack to effect a satisfactory curing operation without overheating and overcuring the tires in the upper part of the stack. This results in a number of the tires being improperly cured so that the rubber does not have the desired wear-resisting characteristics. Furthermore, chambers of this type are difficult to load and unload, particularly in the case of heavy articles, such as truck tires which must be lifted at least as high as the top of the kettle and then lowered into the interior thereof. With kettles of this type it is impossible to cure simultaneously tires which vary widely in size since it is impossible to stack such widely varying sizes of tires within the kettle.

It is accordingly an object of our invention to provide a method of steam curing which overcomes the above noted disadvantages.

It is also an object of our invention to provide a method of steam curing in which each article is supported independently of other articles within a steam curing chamber.

It is also an object of our invention to provide a method of the character set forth in the preceding paragraphs in which each of the independently supported articles is continuously moved during the curing process.

It is a further object of our invention to provide a method of the character set forth in the preceding paragraphs in which the articles are so disposed in the chamber so that any condensation of steam in the chamber will not affect the proper curing of the articles in the chamber.

It is also an object of our invention to provide a method of the character set forth in the preceding paragraphs which achieves uniformity of results by subjecting each article to the same uniform temperature.

It is a still further object of our invention to provide a method of the character set forth in the preceding paragraphs in which the uniform temperature is maintained within the chamber by agitating the atmosphere of steam surrounding the articles to prevent stratification thereof.

It is also an object of our invention to provide a steam curing apparatus which includes a horizontally disposed steam chamber to permit articles to be readily placed within and removed therefrom.

It is also an object of our invention to provide an apparatus of the character set forth in the preceding paragraphs in which means is provided for supporting each article independently of other articles.

It is an additional object of our invention to provide an apparatus of the character set forth in the preceding paragraphs in which the supporting means is so constructed as to maintain the articles supported thereby continually in motion during the curing process.

It is also an object of our invention to provide an apparatus of the character set forth in the preceding paragraphs in which a means is provided for preventing uneven and improper curing of articles such as hollow penumatic tire casings as a result of moisture condensing within the interior of the tire.

It is a still further object of our invention to provide an apparatus of the character set forth in the preceding paragraphs in which a means is provided for agitating the atmosphere within the chamber for the purpose of maintaining a uniform temperature throughout the interior of the chamber.

Other objects and advantages of our invention will be apparent from a study of the following specifications, read in connection with the accompanying drawings, wherein:

Fig. 1 is a perspective view illustrating one form of apparatus which is particularly suited to the practice of the method of our invention;

Fig. 2 is a longitudinal vertical section of the apparatus illustrated in Fig. 1 taken substantially along the line II—II of Fig. 1 to show the details of interior construction;

Fig. 3 is a fragmentary plan view illustrating the details of construction of a hinge which may be employed for mounting the closure for the chamber illustrated in Figs. 1 and 2;

Fig. 4 is a fragmentary vertical section illustrating one form of locking means which may be used for locking a clamping ring in place to clamp the closure member to the chamber;

Fig. 5 is a fragmentary horizontal section taken substantially along the line V—V of Fig. 4 showing additional details of construction;

Fig. 6 is a fragmentary cross sectional view taken through the edge of the closure member and the flange of the chamber against which the closure member bears to illustrate the manner in which the clamping ring operates to effect a gas-tight seal between these members;

Fig. 7 is a schematic side elevational view illustrating a modified form of apparatus for moving the clamping ring sections toward and away from each other to clamp and unclamp the closure member to the chamber;

Fig. 8 is a schematic front elevational view of the apparatus illustrated in Fig. 8 and illustrating additional details of construction;

Fig. 9 is a fragmentary vertical section illustrating one manner in which the actuating feed screws employed in the form of apparatus illustrated in Figs. 7 and 8 may be coupled to the clamping ring sections;

Fig. 10 is a fragmentary sectional view through the tire supporting structure illustrating the use of an auxiliary support to prevent swaying or oscillation of the tires.

We have illustrated in the accompanying drawings a form of apparatus which is particularly suited to the practice of the method of our invention, and the various novel steps and operations comprising our method will be described in connection with the use and operation of the form of apparatus disclosed and described hereinafter.

Referring to the drawings, we have illustrated in Figs. 1 and 2 a curing chamber which may comprise a substantially cylindrical chamber or tank 1, one end of which may be permanently closed by means of an end bell 2. The casing or chamber 1 is preferably disposed with its longitudinal axis extended horizontally and maintained a convenient distance above a floor or working surface 3 as by means of a supporting base structure 4.

The end of the chamber 1 opposite to that which is permanently closed by the end bell 2 is fitted with a closure member 5. The closure member 5 being of considerable weight is preferably carried upon the chamber 1 by means of a hinge structure 6. As is clearly shown in Figs. 1 and 3 the hinge structure 6 may include an arm 7 which is securely affixed to the closure member 5 as by welding or other suitable means in a position to extend horizontally outward away from the axis of the chamber 1. The outer end of the arm 7 is preferably bifurcated so as to extend over a similar coacting bracket 8 which is secured to the exterior of the chamber 1. The bracket 8 and the arm 7 are provided with vertical bores at their extremities for receiving a hinge pin 9 adapted to interconnect these members and provide for the free pivotal movement of the closure member 5 about a vertically disposed axis.

The rubber articles which may be placed within the chamber 1 must be subjected to a high temperature and as a means for obtaining this high temperature we prefer to employ steam of the pressure and temperature desired. The lower part of the chamber 1 is accordingly provided with a steam connection 10 through which such steam may be supplied to the interior of the chamber 1. If desired, the chamber may also be equipped with a pressure gauge 11, a safety valve 12, and air relief valve 13, and a by-pass or blow-off valve 14. These may, as is indicated in Fig. 2, be connected by suitable fittings to a nipple 15 which is secured into the top of the chamber 1 and which extends into communication with the interior thereof.

These devices are preferably disposed near one end of the chamber 1 so that by providing a second blow-off valve 15a and suitable connection 15b therefor at the opposite and of the chamber 1, all entrapped air may be effectively discharged from the chamber by opening both valves 14 and 15a.

Inasmuch as the pressure which must be maintained within the chamber 1 in order to achieve the desired high temperature is considerable, we prefer to form the abutting edges of the closure member 5 and the chamber 1 in such fashion as to provide a high pressure steam-tight seal so as to prevent escape of steam between the abutting edges of these members. Such a seal may be readily achieved by employing a construction such as is illustrated in Figs. 2 and 6. As shown therein the abutting edges of the closure member 5 and the chamber 1 are provided with integral flange members 16 and 17, the flange member 17 of the chamber 1 being recessed as indicated at 18 to receive high pressure and high temperature packing 19 of any suitable character.

It is, of course, necessary that the flanges 16 and 17 be securely clamped to each other in order to render this packing effective as a seal, and for this purpose we employ a split clamping ring comprising ring halves 20 and 21. Each of these halves is preferably provided with an I cross section such as is illustrated in Fig. 6, the lower recess formed thereby being characterized by sloping or tapered sides 22 and 23. The exterior surfaces of the flange members 16 and 17 are provided with correspondingly tapered sides so that, as illustrated in Fig. 6, downward movement of the clamping ring section 20 will provide a wedging force through the interaction of the inter-engaging tapered surfaces tending to move the flanges 16 and 17 toward each other to securely clamp the packing 19 therebetween.

The clamping ring sections 20 and 21 may be forcibly drawn toward each other to provide this clamping action by forming each of these sections with an enlarged end or bosses such as is indicated at 24 in Fig. 1 and by providing clamping bolts 25 and 26 adapted to inter-engage corresponding bosses 24 on the ring sections 20 and 21.

The construction employed in the preferred embodiment of our invention is clearly illustrated in Fig. 4 in which the clamping bolt 25 is illustrated as being permanently engaged with the boss on the lower ring section 21 as by a threaded connection 27 therewith. The bolt 25 is extended upwardly through a clearance hole 28 formed in the boss 24 on the upper ring section 20. The upper end of the clamping bolt 25 is threaded to receive a clamping nut 29 adapted to bear against a horseshoe spacer 30 which is interposed between the nut 29 and the upper surface of the boss 24. It will be observed that tightening the nut 29 down against the horseshoe spacer 30 simultaneously with the tightening of a corresponding nut and spacer associated with the clamping bolt 26 will operate to draw the ring sections 20 and 21 toward each other to effect the desired clamping of the closure member 5 to the end of the chamber 1.

Inasmuch as the clamping ring sections 20 and 21 must be widely separated, as is indicated in Fig. 1, whenever it is desired to open the closure member 5 for the purpose of inserting or removing articles from the interior of the chamber 1, we prefer to provide a counterbalancing mechanism so that the relatively great weight of these ring sections will not impose any particular burden upon an operator attempting to perform the opening or closing operation. This counterbalancing may be readily achieved by providing on the top of the chamber 1 a pair of upwardly and outwardly extending arms 31 and 32 which terminate in pivotal supports for pulleys or sheaves 33 and 34. Cables 35 and 36 may be attached to opposite sides of the upper ring section 20 as by means of I bolts 37 and 38 and passed over the sheaves 33 and 34 and into connection with the upstanding ends of the clamping bolts 25 and 26. The connection between the cables 35 and 36 and the clamping bolts 25 and 26 may be readily effected by providing I bolts 39 which are threadedly engaged with a threaded bore provided in the upper end of the clamping bolts 25 and 26. It will be observed that with this arrangement the weight of one of the ring sections operates to counterbalance the weight of the other ring section so that these sections may be mutually and simultaneously moved toward or away from each other with relatively little effort.

Separable movement of the ring sections away from each other may be arrested by means of stop members, each of which may comprise a vertically extending rod 39a secured to the exterior of the chamber 1 and including a head portion 39b adapted to arrest outward movement of a lug 39c which is secured to the ring section and which encircles the rod 39a.

It has been found that the length of the clamping bolts 25 and 26 may be materially reduced and the amount of movement of the clamping nuts 29 required to effect the desired clamping operation may be materially reduced through the use of the aforementioned horseshoe spacer 30. By using this spacer it is only necessary to loosen the clamping nut 29 and then slide the spacer 30 horizontally outward from around the clamping bolts 25 and 26 in order to provide for sufficient separable movement between the ring halves 20 and 21 to release the closure 5 from the chamber 1.

We have found, however, that after having been left closed for a considerable length of time and after having been subjected to the relatively high temperature which is employed for curing rubber articles placed within the chamber, the ring sections 20 and 21 tend to stick and be difficult to start in their separable movement. In order to facilitate the initial separation of these ring sections we provide a mechanical means for applying a separating force therebetween. This mechanical means may include a pair of pneumatic or hydraulic cylinders 40 and 41 which are secured to the lower ring section 21 as by threaded engagement between the upper end of the cylinders and a suitable threaded bore provided in the lower surface of the bosses 24 as indicated at 42 in Fig. 4. These lower bosses are also provided with a continuing bore through which piston rods 43 and 44 may extend upwardly into engagement with the under surface of the upper pair of bosses 24. A suitable pneumatic fluid may be admitted to the cylinders 40 and 41 by means of fluid connections 45 and 46 to force the piston rods 43 and 44 upwardly into engagement with the under surfaces of the upper bosses 24 to apply a force between the ring sections 20 and 21 and effect the initial separation thereof.

Movement of the ring sections 20 and 21 toward each other when it is desired to close the chamber 1 may be facilitated through the use of a foot pedal 47 which may include a pedal portion 48 secured to a transversely extending arm 49 pivotally connected as indicated at 50 in Figs. 1 and 2 to a suitable supporting bracket 51 provided on the supporting structure 4. The arm 49 may include a portion 52 which is normally disposed below the center of the lower ring section 21 and adapted to be brought into engagement with a roller 53 pivotally supported within the channel formed by the I section of this clamping ring so that downward movement of the pedal portion 48 may be translated into an upward movement of the lower ring section 21. The upward movement of the ring section 21 will cause a corresponding downward movement of the ring section 20, bringing these sections into relatively closely abutting relation so that the horseshoe spacers 30 may be interposed between the clamping nuts 29 and the bosses 24. The clamping nuts 29 may then be tightened to effect the desired seal as hereinbefore described.

The method of our invention comprehends the supporting of articles to be cured within the chamber 1 independently of other articles which are also placed within the chamber. The method further comprehends the supporting of these articles in such fashion that the articles are held in spaced relation to each other and in spaced relation to the side walls of the chamber, thus avoiding any danger of marring or distorting the new and uncured rubber before it has had an opportunity to become completely cured. Moreover, to insure the uniform application of heat throughout all portions of the new rubber material, we prefer to maintain the article in motion during the curing process.

When the vulcanizing or curing process is to be performed on pneumatic tires, the tires may be supported in the desired fashion and the tires kept in motion by suspending the tires upon a shaft through which rotary motion may be imparted to the tires. Such rotary motion will result not only in disposing all parts of the tires successively to the same level of heat within the chamber, but will cause an agitation of steam within the chamber to more nearly provide a uniform temperature throughout the chamber.

Another advantage accomplished by rotating the tires is that should steam condense within the interior of the tires rotation of the tires will constantly shift the location of such condensed moisture and insure the exposing of all portions of the tire uniformly to the heat effects of the steam within the chamber.

The form of apparatus illustrated herein is particularly adapted for the suspending and curing of such tires as by providing a horizontally extending shaft within the chamber upon which tires may be rotatably mounted in any suitable manner as by suspending them upon such shaft with the bead faces of the tires engaging the shaft, to which shaft rotary motion may be imparted as by means of any suitable power apparatus. We have discovered that when suspended upon such rotating shaft the tires have a tendency to swing upon the shaft in a pendulum-like motion which might cause the rubbing together of adjacent tires with attendant damage to them. To overcome this difficulty we prefer to provide a two-point suspension as by providing a second horizontal shaft parallel to and spaced laterally from the first shaft, the two shafts being sufficiently close together in order to permit the ready threading of the tires thereon.

One form of apparatus for this purpose as illustrated herein may include a cantilever beam 54 which is extended forwardly along the interior of the chamber 1 from the end bell 2 to which it is securely affixed as by welding. The beam 54 is preferably of a T-shaped cross section including a horizontally disposed flange 55 and a downwardly extending web 56, the web and flange cooperating to impart great stiffness and rigidity to the beam. This beam is employed as a means for supporting the aforementioned shafts identified herein by the reference characters 59 and 60 which are journaled for rotation in bearing members 57 and 58 secured upon opposite ends of the beam 54. Tires, such as that illustrated at 61 in Fig. 2, may be supported by threading these tires over the beam 54 so that the beam and shafts extend through the rim opening or inner circle of the tire, the tires being supported through engagement of their bead surfaces with the shafts 59 and 60.

Rotary motion for rotating the tires 61 may be imparted to the drive shaft 60 by extending the shaft through the inner bearing 58 so as to provide an attachment by means of a coupling 63 to a gear reduction unit 64 which may in turn be connected to any suitable source of power such as an electric motor 65. The gear reduction unit and the electric motor 65 may be supported upon a rearwardly extending bracket 66 formed upon or secured to the exterior of the end bell 2. Leakage of steam around the extension of the shaft 60 may be prevented by employing a packing gland 67 of any suitable construction.

It will be observed that by thus rotating the shaft 60 a corresponding rotary motion will be imparted to each of the tires 61 resting thereon, by a frictional engagement of the shaft 60 with the inner faces of the tire beads so as to keep the tires continually in motion and effect a uniform application of heat thereto. Should inadvertent and unforeseen creeping of the tires along the length of the shafts 59 and 60 occur as a result of this rotation, such creeping may be arrested at the ends of the shafts by providing flange members at the extremities thereof constructed along the lines indicated in Fig. 2 at 62.

Furthermore, such creeping motion as may inadvertently occur might bring the side walls of adjacent tires together and cause damage thereto by scuffing action. We have discovered that such damage may be prevented by interposing between adjacent tires separators 67a for preventing the side walls from coming into contact with each other. While other means for so separating or spacing the side walls of adjacent tires will achieve the desired result, the construction illustrated in Fig. 2 as comprising a thin sheet metal washer having inside and outside diameters substantially the same as the tires has been found to be inexpensive and effective.

The steam curing apparatus of our invention may also be employed for the curing of articles other than tires by suspending these articles in any suitable manner as by hooks from the cantilever beam or supporting member 54. Furthermore, if desired, shelves or other similar supporting elements may be either temporarily or permanently arranged inside the chamber for supporting other types of articles having parts, at least, formed of uncured rubber.

We have discovered that the uniformity of temperature throughout the interior of the chamber may be improved by providing a baffle 68 over the opening through which the steam is admitted to the interior of the chamber. This baffle may, as is illustrated in Figs. 1 and 2, comprise a small plate 69 horizontally disposed and supported in spaced relation to the supply opening by means of legs or other spacing members 70. We have found that by admitting the steam at the bottom of the chamber, by employing a baffle over the inlet opening, and by agitating the atmosphere within the chamber by means of the rotation of the tires 61, the temperature differential between the hottest and coldest points within the chamber 1 may be kept as low as three degrees Fahrenheit.

We have illustrated in Figs. 7, 8 and 9 an alternative type of mechanism which may be employed for separating the ring halves 20 and 21. As illustrated in these figures, the bosses 24 may be bored to receive upwardly extending feed screws 71 and 72. Each of these feed screws is provided on its lower portion with right hand threads 73 and on its upper portion with left hand threads 74. These threaded portions are engaged with correspondingly threaded nuts 75 and 76 carried in suitable recesses formed in the body of the lugs 24. It will be observed that rotation of the feed screws 71 and 72 in one direction will operate to move the ring sections 20 and 21 away from each other while a reverse rotation will operate to move the ring sections toward each other.

The feed screws 71 and 72 may be coupled together for simultaneous rotation by means of bevel gears 77 affixed to the lower end of each of these feed screws and drivably engaged with similar bevel gears 78 mounted on the ends of an interconnecting countershaft 79. Power for rotating the feed screws 71 and 72 may be derived from the aforementioned electric motor 65 by means of a belted connection 80 extending between a pulley 81 affixed to the power take-off shaft of the gear reduction unit 64 and another pulley 82 secured to a longitudinally extending drive shaft 83. The drive shaft 83 may be coupled by means of a clutch 84 to a shaft extension 85 which carries on its outer end a bevel gear 86 arranged to mesh with and drive one of the aforementioned bevel gears 77.

In order that this mechanism may be used for both opening and closing the ring sections, it is preferred that the motor 65 be reversible in operation, although the same result could be achieved by interposing a reversing gear system between the drive shaft 83 and the mechanism which is driven thereby. It is intended that such a mechanism be employed for opening and closing the ring sections, but it is anticipated that such a mechanism may not have sufficient power to provide the necessary forcible clamping of the ring halves to achieve the desired gas-tight seal. The clamping bolts 25 and 26 are accordingly retained in this modification so that tremendous clamping pressures may be exerted upon the ring halves. Since such clamping pressures may result in relative movement between the ring sections, we prefer to make the recesses in which the nuts 75 and 76 are disposed of such shape as to provide for a slight amount of vertical movement of these nuts relative to the lugs 24, thus permitting the nuts to remain stationary on the feed screws and the ring sections 20 and 21 to be moved relative thereto during the time they are being clamped together by means of the clamping bolts 25 and 26.

The present kettle constructions are open topped devices so that in unloading such kettles an operator is required to climb to the top of the kettle by means of a ladder or similar aid and then to all intents and purposes lower himself within the chamber in order to remove the articles which are resting on or near the bottom of the chamber. This is a very difficult undertaking because of the weight and temperature of the articles which must be handled, the amount of lifting which is required, and the extremely hot atmosphere to which an operator is subjected during the performance of these tasks.

With the device constructed along the lines herein, it is only necessary for an operator inserting or removing tires from the chamber to lift these tires to a moderate height such as is required to permit the threading of the tires over the supporting member. The chamber is so constructed that an operator may readily place tires or similar articles in such position while standing on the floor and the tires may be threaded on to the supporting member without requiring the operator to get inside the chamber.

From the foregoing it will be observed that by disposing the axis of the chamber 1 horizontally we are enabled to so locate the closure member 5 as to permit rubber articles, such as tires and the like, to be inserted or removed from the chamber in a ready and easy manner.

It will be observed, furthermore, that the method of our invention provides for the protection of articles during the curing process from injury or distortion due to contact with other articles or with means which is employed to support these articles during the time the rubber which is being cured is in a soft or plastic state.

Furthermore, the method and apparatus of our invention is characterized by supporting each of the articles to be cured in such position that any moisture which condenses out of the steam used for heating these articles will not effect proper curing of these articles since each article is supported in spaced relation to the bottom walls of the chamber and is continuously moved so as to permit any such moisture which would tend to collect within hollows of any part of the article to run by gravity off of that part as the article is moved to a new position within the chamber.

It will be observed that we have provided for maintaining a substantially uniform and constant temperature within the chamber so as to insure the uniform curing of all of the articles placed within the chamber.

Attention is also called to the fact that with the apparatus described herein it is possible to cure many and divers sizes of tires by virtue of the independent support provided for each tire in contra-distinction to previous methods wherein the tires were stacked one upon the top of the other within the kettle.

While we have shown and described the preferred embodiment of our invention, we do not desire to be limited to any of the details of construction shown or described herein, except as defined in the appended claims.

We claim:

1. In a steam curing apparatus for vulcanizing uncured rubber parts of tires, the combination of: a curing chamber connected to a steam supply; a supporting member secured to one wall of said chamber and extending horizontally within the interior of said chamber in the upper portion thereof; and means for supporting tires placed in a position encircling said support member comprising a roller means carried on the upper side of said support for engaging the beads of said tires.

2. In a steam curing apparatus for vulcanizing uncured rubber parts of tires, the combination of: a curing chamber connected to a steam supply; a cantilever beam secured to one wall of said chamber and extending horizontally within the interior of said chamber in the upper portion thereof; a pair of roller means disposed in side by side relation on the upper side of said beam, at least one of said roller means including a shaft portion extended through said wall of said chamber to the exterior thereof; means journaling said roller means for rotation; and means outside said chamber coupled to said shaft portions for rotating said roller means, whereby tires placed in a position encircling said cantilever beam with their beads resting on said roller means will be rotated in said chamber.

3. In a steam curing apparatus for vulcanizing uncured rubber parts of tires, the combination of: a curing chamber connected to a steam supply; a support member secured to one wall of said chamber and extending horizontally within the interior of said chamber in the upper portion thereof; a roller means carried on the upper side of said support member and extending parallel thereto; means journaling said roller means for rotation; means for rotating said roller means, whereby tires placed in a position encircling said support member with the beads resting on said roller means may be rotated in said chamber; and flange means on the ends of said roller means for engaging the beads of said tires to arrest movement of said tires in the direction of the length of said roller means.

4. In a steam curing apparatus for vulcanizing uncured rubber parts of tires, the combination of: a curing chamber for receiving said tires, means for supplying steam to the interior of said chamber, means suspending said tires in said chamber comprising a supporting member extending horizontally within said chamber and insertable into the rim opening of said tires, a roller rotatably mounted above and supported by said supporting member and extending parallel thereto to engage the bead portions only of said tires, said roller having a diameter smaller than the diameter of the rim opening of said tires, whereby the interior and exterior of the tires are equally subjected to heat and pressure of the steam in said chamber, and means for rotating said roller to thereby rotate the tires suspended thereon while said tires are subjected to said steam.

5. In a steam curing apparatus for vulcanizing uncured rubber parts of tires, the combination of: a curing chamber for receiving said tires, means for supplying steam to the interior of said chamber, means suspending said tires in said chamber comprising a shaft extending horizontally within said chamber and insertable into the rim opening of said tires to engage the bead portions only of said tires, said shaft having a diameter smaller than the diameter of the rim opening of said tires, whereby the interior and exterior of the tires are equally subjected to the heat and pressure of the steam in said chamber, means for rotating said shaft to thereby change the point of contact between the shaft and the beads of the tires and to rotate the tires suspended therein while they are subjected to said steam, and means extending through said rim opening of said tires and parallel with said shaft and spaced laterally therefrom to engage the beads of the tires at points spaced from the engagement thereof by said shaft to thereby minimize swaying of said tires while they are rotating.

6. In a steam curing apparatus for vulcanizing uncured rubber parts of tires, the combination of: a curing chamber for receiving said tires, means for supplying steam to the interior of said chamber, means suspending said tires in said chamber comprising a shaft extending horizontally within said chamber and insertable into the rim opening of said tires to engage the bead portions only of said tires, said shaft having a diameter smaller than the diameter of the rim opening of said tires, whereby the interior and exterior of the tires are equally subjected to the heat and pressure of the steam in said chamber, means for rotating said shaft to thereby change the point of contact between the shaft and the beads of the tires and to rotate the tires suspended therein while they are subjected to said steam, and a second rotatable shaft extending through said rim opening and parallel with said first shaft and spaced laterally therefrom to engage the beads of the tires at points spaced from the engagement thereof by said first shaft to thereby minimize swaying of said tires while they are rotating.

7. In a steam curing apparatus for vulcanizing uncured rubber parts of tires, the combination of: a curing chamber for receiving said tires, means for supplying steam to the interior of said chamber, means suspending said tires in said chamber comprising a shaft extending horizontally within said chamber and insertable into the rim opening of said tires to engage the bead portions only of said tires, said shaft having a diameter smaller than the diameter of the rim opening of said tires, whereby the interior and exterior of the tires are equally subjected to the heat and pressure of the steam in said chamber, means for rotating said shaft to thereby change the point of contact between the shaft and the beads of the tires and to rotate the tires suspended therein while they are subjected to said steam, and rings suspended on said shaft and disposed between adjacent tires to hold said tires in spaced relation to each other while said tires are rotating.

8. In a steam curing apparatus for vulcanizing uncured rubber parts of tires, the combination of: a curing chamber for receiving said tires, means for supplying steam to the interior of said chamber, means suspending said tires in said chamber comprising a shaft extending horizontally within said chamber and insertable into the rim opening of said tires to engage the bead portions only of said tires, said shaft having a diameter smaller than the diameter of the rim opening of said tires, whereby the interior and exterior of the tires are equally subjected to the heat and pressure of the steam in said chamber, means for rotating said shaft to thereby change the point of contact between the shaft and the beads of the tires and to rotate the tires suspended therein while they are subjected to said steam, and flat washers having an internal diameter substantially equal to the diameter of the rim openings of said tires suspended on said shaft and disposed between adjacent tires to hold said tires in spaced relation to each other while said tires and rings are rotated by said shaft.

9. In a steam curing apparatus for vulcanizing uncured rubber parts of tires, means providing a curing chamber, means for supplying steam to the interior of said chamber, and means for supporting and rotating a tire within the chamber, including a rotatable roller having a horizontal axis, and adapted to engage the inner faces of the tire beads to drive said tire by direct frictional contact with said beads, said roller axis being spaced from the bottom of the chamber to permit free rotation of the tire supported thereon, and means for rotating said roller.

ARCH B. CLEVELAND.
EMIL G. HAAG.
CECIL L. RAY.